US007711126B2

(12) United States Patent
Braithwaite

(10) Patent No.: US 7,711,126 B2
(45) Date of Patent: May 4, 2010

(54) AUDIO DISTRIBUTION SYSTEM WITH LOCAL INTEGRALLY WALL MOUNTED CONTROL POINT NODES

(75) Inventor: Michael Braithwaite, Las Cruces, NM (US)

(73) Assignee: Netstreams, LLC, Austin, TX (US)

(*) Notice: Subject to any disclaimer, the term of this patent is extended or adjusted under 35 U.S.C. 154(b) by 1153 days.

(21) Appl. No.: 11/078,874

(22) Filed: Mar. 14, 2005

(65) Prior Publication Data

US 2006/0204018 A1 Sep. 14, 2006

(51) Int. Cl.
*H04B 3/00* (2006.01)

(52) U.S. Cl. .......................... 381/77; 381/80; 381/306; 379/101.01

(58) Field of Classification Search .................. 381/77, 381/85, 80–82, 110, 300, 306, 104; 379/101.01; 370/328, 338
See application file for complete search history.

(56) References Cited

U.S. PATENT DOCUMENTS 3,553,379 A * 1/1971 Boomgaard .................... 381/4
4,401,852 A * 8/1983 Noso et al. .................. 367/198
4,825,209 A 4/1989 Sasaki et al.
5,235,414 A 8/1993 Cohen
5,661,811 A 8/1997 Huemann et al.
5,761,320 A 6/1998 Farinelli et al.
5,854,594 A 12/1998 Lin et al.
6,389,139 B1 5/2002 Curtis et al.
6,501,389 B1 * 12/2002 Aguirre ................. 340/825.25
6,803,728 B2 10/2004 Balasubramaniam et al.
6,826,283 B1 * 11/2004 Wheeler et al. ................ 381/77
6,907,458 B2 * 6/2005 Tomassetti et al. .......... 709/223
7,082,203 B1 * 7/2006 Drakoulis et al. ............. 381/77
2002/0188762 A1 * 12/2002 Tomassetti et al. .......... 709/251
2003/0023741 A1 1/2003 Tomassetti et al.
2006/0153155 A1 * 7/2006 Jacobsen et al. ............ 370/338

FOREIGN PATENT DOCUMENTS

CA 2283577 A1 3/2001
CA 2539458 A1 9/2006
EP 1703653 9/2006
KR 1020010083810 A 9/2001
WO 9909787 A1 2/1999
WO 03096741 A2 11/2003

OTHER PUBLICATIONS

European Search Report received for EP Patent Application No. 06251345.2, mailed on Oct. 15, 2009, 6 pages.

* cited by examiner

*Primary Examiner*—Vivian Chin
*Assistant Examiner*—Jason R Kurr
(74) *Attorney, Agent, or Firm*—Matthew J. Booth & Associates, PLLC; Matthew J. Booth

(57) ABSTRACT

An integrally mounted control point node for use in an audio distribution system and including a control processor for receiving command signals and providing audio control signals to response thereto; a command signal generator for producing the command signals in response to activation by a user of the system; a terminal for receiving a plurality of audio signals; an audio signal tuner for receiving the control signals and the audio signals; an amplifier receiving an output signal from the tuner and the control signals from the control processor; and a speaker terminal for transmitting the output signal to a speaker.

12 Claims, 10 Drawing Sheets

AUDIO DISTRIBUTION SYSTEM WITH LOCAL INTEGRALLY WALL MOUNTED CONTROL POINT NODES

BACKGROUND OF THE INVENTION

The present invention relates generally to the residential and the commercial premise distributed audio industries and, more particularly, to audio, video and control systems for multiple room home or office facilities.

Currently, most audio distribution systems consist of a central control processor, amplifiers, matrix switches, sources, speakers, and keypads (further referenced here as Control Point Nodes). All of these components installed together comprise an audio distribution system. Typically in these systems sources, such as CD players, Music Servers, Satellite tuners, AM/FM tuners, tape decks, etc. . . . are centrally located and connected to a matrix switch via analog or digital signals. The signals are then routed to centrally located or remotely located amplifiers. The signal is amplified and then the signals are routed to the speakers for transduction within the installation spaces. In many of these installation systems the matrix switch and multiple amplifiers can create what is known as a multi source to multi room system. Thus, content from different sources can be reproduced in different rooms at the same time, and or the same source can be reproduced in all rooms.

The typical way a user would control the source such as channel up, down or next track, as well as controlling the acoustical properties in the room such as volume and tone is via a small control point node. These control point nodes are typically wall mounted so that the control surface and display (if designed) are easily accessible by the user. These control point nodes can be installed within a single gang, or multiple gangs, or in some cases larger than standard electrical boxes.

Examples of such prior audio systems are disclosed in U.S. Pat. Nos. 6,803,728; 6,501,389; and, 6,389,139; and PCT/AU98/00647.

A significant disadvantage of currently available multi-room systems is their use of a fixed number of inputs available with external tuner source components. A building or large estate with twenty or more rooms equipped to reproduce sound requires a matrix switch capable of at least 20 inputs and outputs and 20 source component radio tuners to allow every room the ability to tune in a different station.

The object of this invention therefore, is to provide in every room of a multi-room facility an integrated wall mounted control point node which allows a user to receive a particular audio input selected from a variety of available sources.

SUMMARY OF THE INVENTION

The invention is an integrally mounted control point node for use in an audio distribution system and including a control processor for receiving command signals and providing audio control signals in response thereto; a command signal generator for producing the command signals in response to activation by a user of the system; and a terminal for receiving a plurality of audio signals. Also included is an audio signal tuner for receiving the control signals and the audio signals, the tuner responding to the control signals by selecting one of the audio signals as an output signal; an amplifier receiving the output signal from the tuner and the control signals from the control processor; and amplifying the output signal in response to the control signals; and a speaker terminal for transmitting the output signal to a speaker. The control point node can be wall mounted to allow multiple room users to individually select a desired audio signal.

According to one feature of the invention, the control processor means includes audio terminal means for receiving a plurality of other audio signals; and a signal processing unit receiving the other audio signals, the signal output, and the audio control signals, the processing unit responding to the control signals by selecting and routing one of the signals to the amplifier. The other audio signals can include, for example, Satellite tuners, CD players, music servers or tape decks.

According to another feature of the invention, the other audio signals include available network audio signals, and the control processor means includes a network I/O for formatting the network audio signals in response to the control signals. This feature allows a user to control a multi-room system away from the control point node.

According to yet another feature, the other signals include local signals received from a local audio I/O, and the control processor includes a local signal I/O for formatting the local signals in response to the control signals. This feature allows a user to control additional information sources in the room retaining the central point node.

According to a further feature of the invention, the generator includes a terminal for receiving the command signals from an external hand held device and a control surface adapted for manual activation by a user to produce the command signals; a display for illustrating selected command signals at the control surface; and a command speaker adapted for audio activation by a user to produce the command signals. These features expand flexible use of the control point node by a user.

According to an additional feature of the invention, the control processor includes a power terminal for receiving power from an external power source, and an energy storage module for supplementing the external power source. This feature provides a steady power level and quick transience response to improve system performance.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
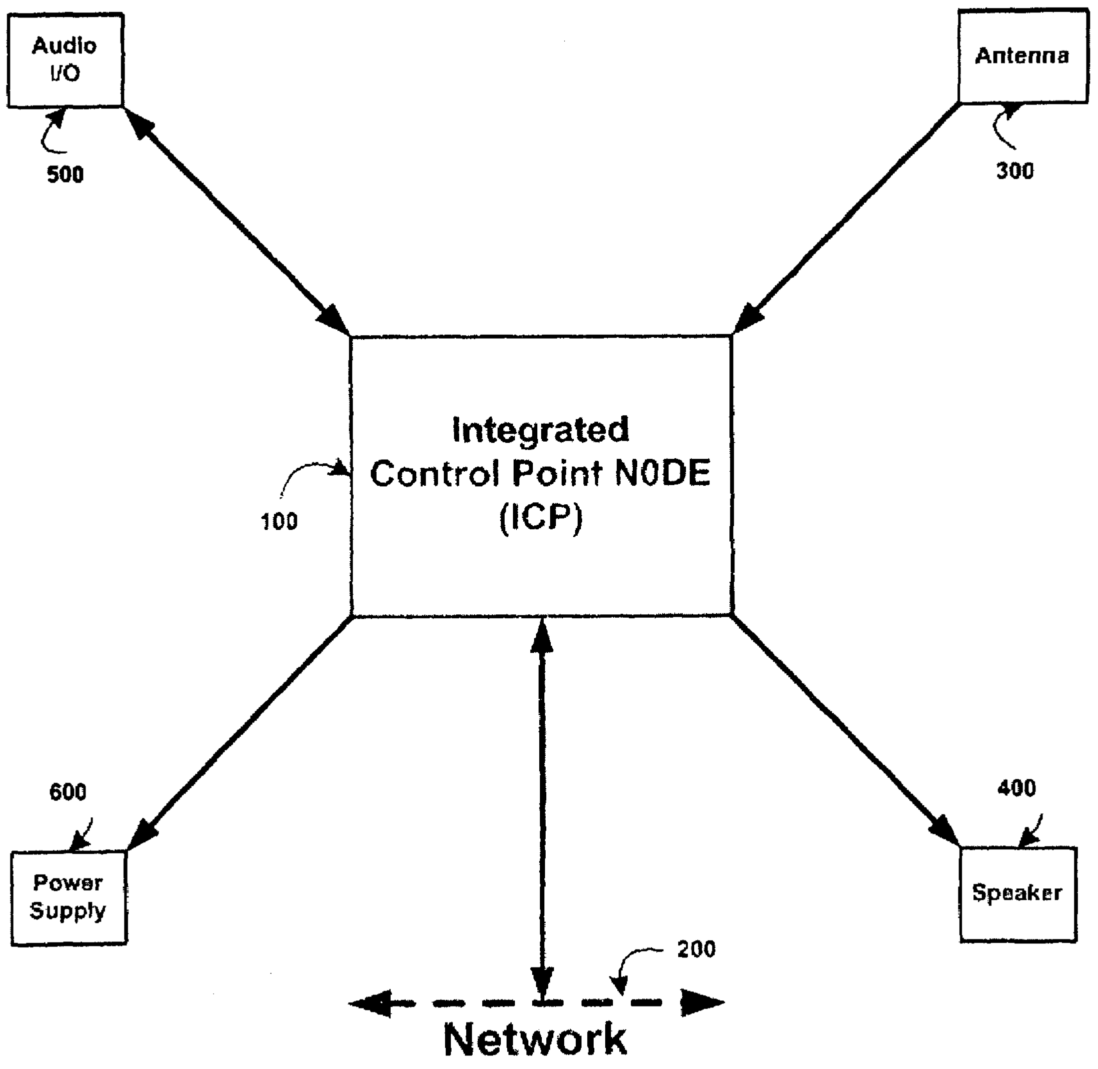
FIG. 1 is a block diagram of an audio system according to the present invention.

Diagrammatically illustrated in FIG. 1 is an audio distribution system having an Integrated Control Point Node (ICP) 100. Analog and Digital Audio signals are received by the ICP 100 via an Audio I/O Node 500 and a Network 200. The received Analog and or Digital Audio signals are created by or transcoded by the ICP 100 and available for use remotely from the ICP 100 via the Audio I/O Node 500 and the Network 200. Terrestrial radio frequencies for use in the ICP 100 also are received via an antenna 300. Power is supplied to the ICP by a power supply 600. The ICP 100 provides powerful amplified signals to drive the transduction in connected speakers 400. In addition, the ICP 100 can transmit and receive data from the network 200 via connections which can be wired or wireless.

Figure 2:
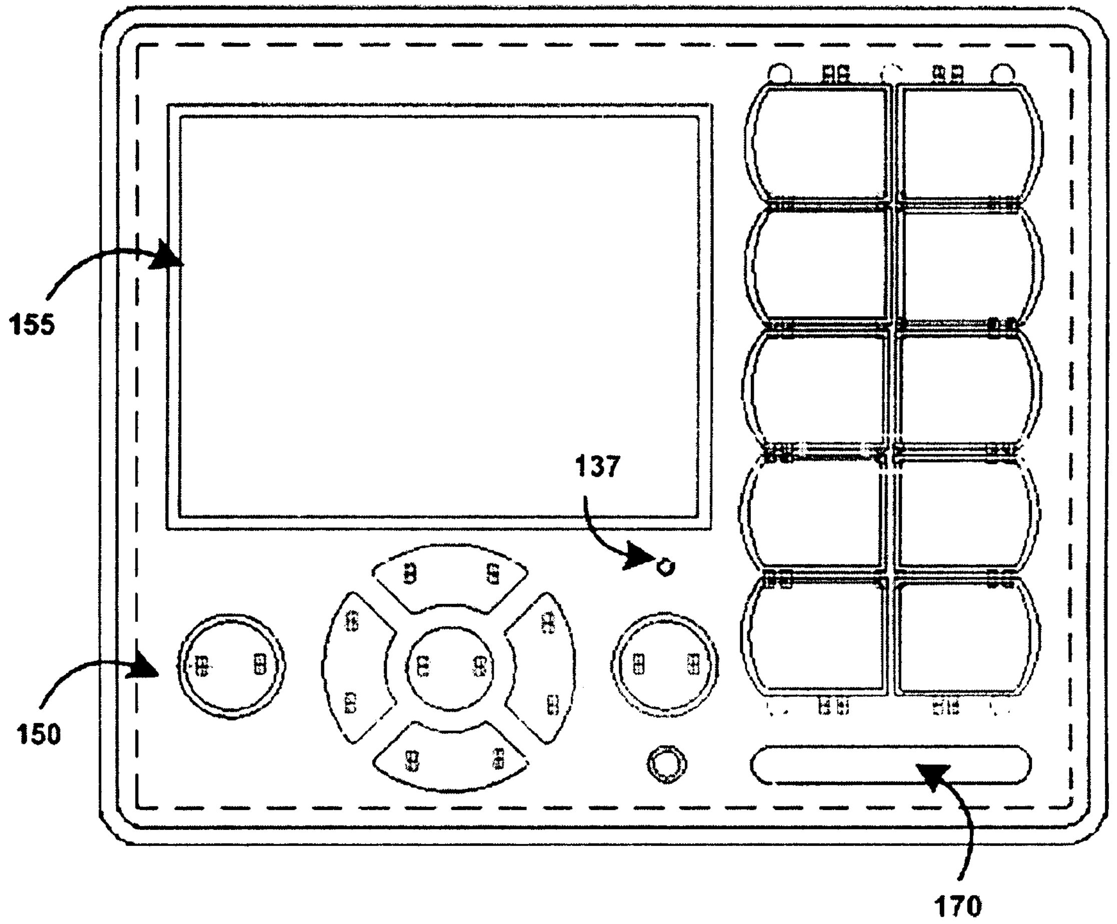
FIG. 2 is a front view of a wall-mountable, integrated Central Point Node utilized in the system of FIG. 1.

In a preferred embodiment, the ICP 100 is an integrally mounted unit as shown in FIG. 2. Externally accessible visually or physically on the ICP 100 is a control surface 150 consisting of a button keypad 154 and a LCD 155. Also accessible on the surface 150 are a Microphone 137 and infrared transceivers 160, 170. The control surface 150 provides a means for physically controlling the audio system and sources via button presses 154, voice control through the Microphone 137, or sensory input via electronic sensors such as the passive infrared transceivers 160, 170, ambient light sensors or external sensors. Also, the control surface 150 can provide visual 155 or audible feedback via speaker 157 to aid with the use and control of the ICP 100. The IR transceivers 160, 170 facilitate infrared and radio frequency input and output for use from remote controlled devices. These devices can extend the functionality of the ICP 100 to a small handheld type device.

Figure 3:
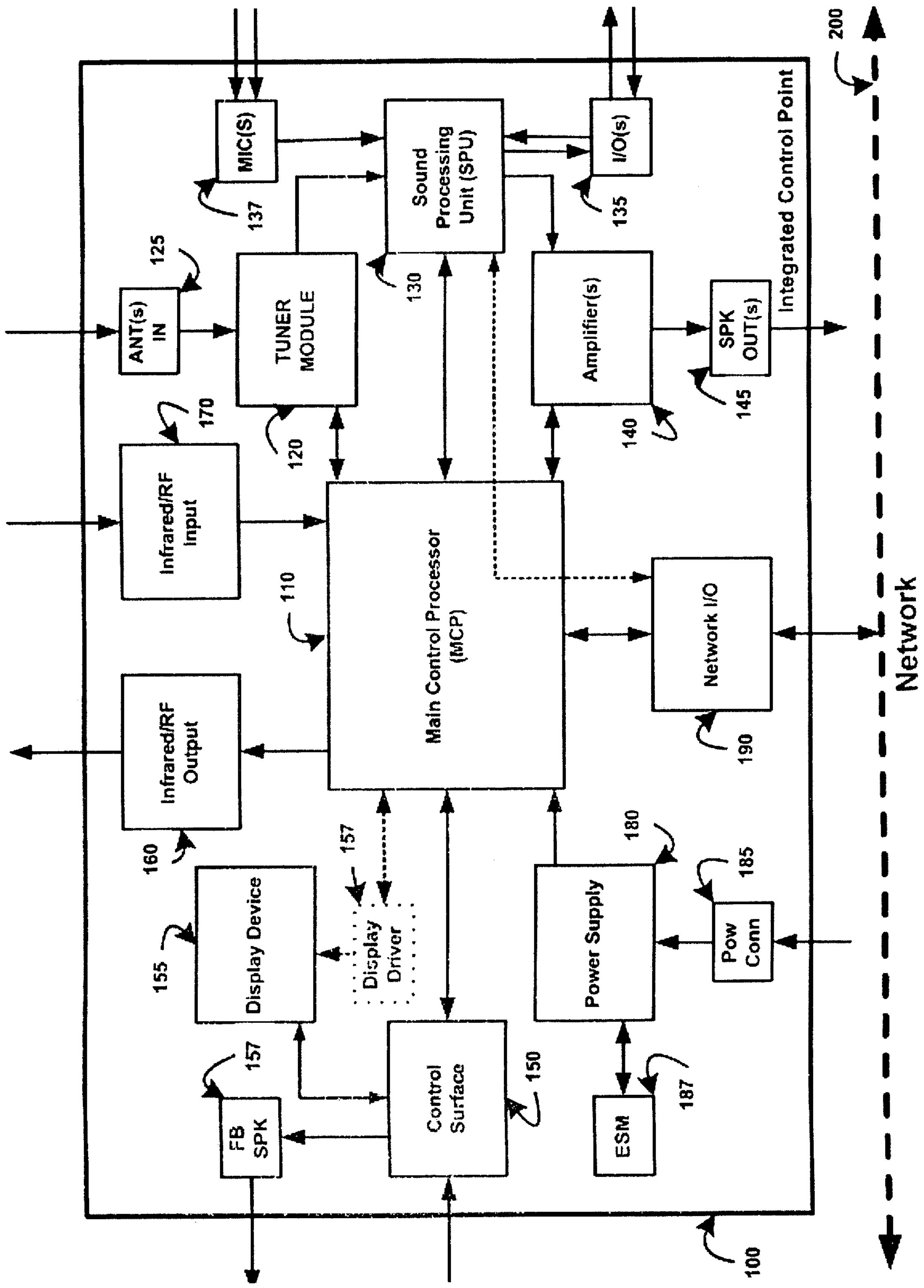
FIG. 3 is a block diagram of components of the Integrated Control Point Node of FIG. 2.

FIG. 3 shows other components mounted behind the control surface 150 inside the ICP 100. A Main Control Processor (MCP) 110 functions to control audio output of the ICP 100 and possesses a memory which can be flash upgradeable for future functionality. Connected to the MCP 110 is an FM tuner 120 also connected to an Antenna input connection 125 which receives audio signals from the antenna 300. The integrated tuner 120 has provisions for both a single antenna and a plurality of antennas commonly known as diversity tuning. Controlling the tuner 120 directly are control signals from the MCP 110 to provide selected audio output signals to a sound processing unit 130. The control signals are provided by the MCP 110 in response to command signals produced on the control surfaces 150 by a user of the system. In addition, the sound processing unit (SPU) 130 also receives from a microphone 137 input for use both in processing data such as for voice control applications and also for use with adaptive room correctional algorithms. The microphone 137 also can be used in calculating installation placement and triangulation, speaker polarity and placement and for use with intercom and or VoIP capabilities.

The SPU 130 also receives, processes, and routes analog and digital audio signals from an audio I/O connection 135 communicating with the audio I/O 500 as well as analog and digital audio signals from the Network I/O 190 associated with the Network 200. The SPU 130 also processes and produces analog and digital audio signals routed to the audio I/O connect 135, Network I/O 190, and to an integrated amplifier 140. Controlled by the MCP 110, the amplifier 140 provides its amplified audio output signal to the Speaker Output connectors 145. The MCP 110 also receives processes, and routes Infrared and radio frequency serial data via an infrared receiver circuit 170 and creates and transmits infrared or radio frequency serial data via an infrared transmission circuit 160. In addition, the MCP 110 is connected to the Network 200 via the Network I/O circuit 190.

The MCP 110 is powered by a power supply circuit 180 connected to the local or global power supply 600 via a power connection 185. In the preferred embodiment of the ICP 100, the power supply 180 is further enhanced by the use of an energy storage module (ESM) 187 which allows for quick transience response and helps the local or global power supply 600 deliver a steady level of power for the audio system to utilize and improve system performance.

The control surface 150 of the ICP 100 is controlled and communicates directly with the MCP 110. As shown in FIG. 2, the control surface 150 may consist of the button pad 154 but in some embodiments may consist of touch panel technology. The display device 155 is part of the control surface 150 and may be controlled directly by the MCP 110, or by a display controller 157 that is controlled by the MCP 110.

Figure 4:
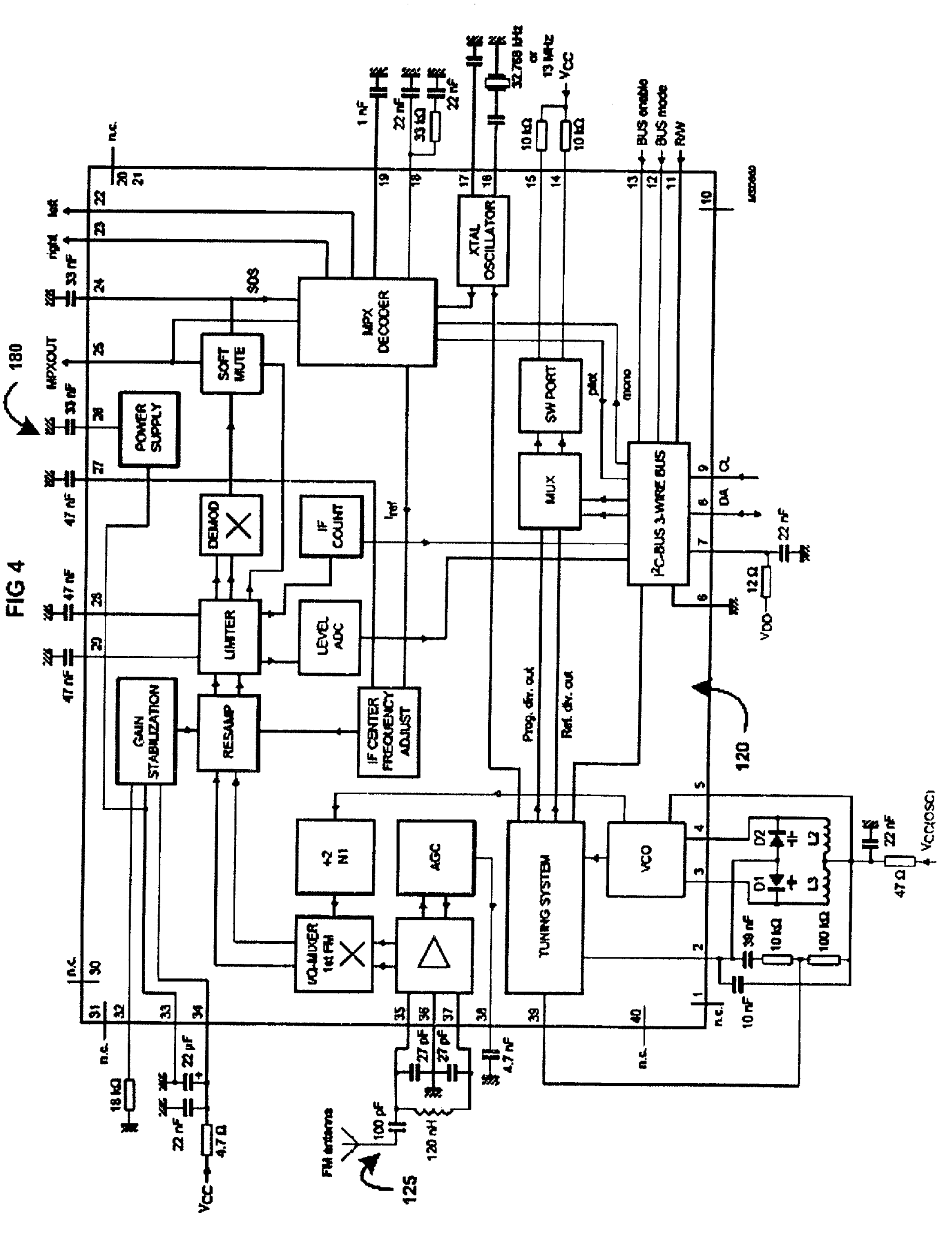
FIG. 4 is a circuit design of an FM tuner component of the Integrated Control Point Node of FIG. 3.

FIG. 4 shows an FM tuner 120 circuit design. In this embodiment the tuner 120 is controlled by the MCP 110 via an 12C data bus. The tuner 120 receives its radio frequencies via the antenna connection 125 and the audio output signals from the tuner 120 are connected directly to the SPU 130.

Figure 5:
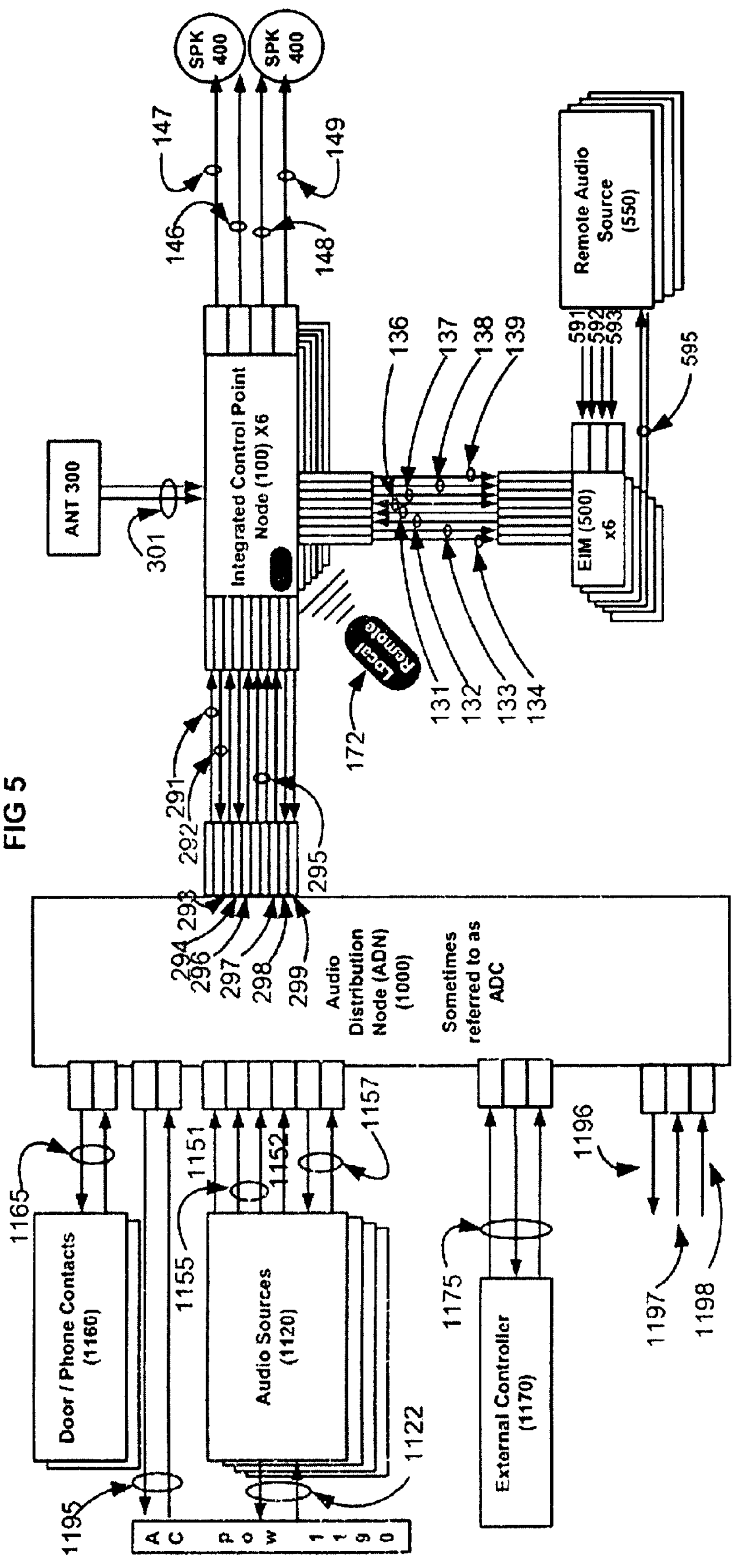
FIG. 5 is a block diagram of an audio system embodiment employing a plurality of Integrated Control Point Nodes shown in FIG. 2.

Typically, an ICP 100 is located within various rooms of a structure and FIG. 5 illustrates its use with an audio port I/O 500. This device serves as a local audio signal input and output to the ICP 100 internal sound processing units and may include an analog to digital converter and or a digital to analog converter. Uses of the I/O 500 include connections to a powered speaker or subwoofer within the room or connections to a local audio component.

FIG. 5 depicts the audio distribution topology in a system wide deployment. A plurality of ICP nodes 100 are connected via a network 200 to a plurality of Audio Distribution Nodes (ADN) 1000. This embodiment also shows connections of the Nodes 100 to External Interface Modules (EIM) 500 to provide both Audio signals and control data. The Modules 500 are in turn connected to remote audio sources 550. Thus, the external sources 550 can connect to both the EIM 500 in the local rooms but also back at the central location and connect to the ADN 1000. The type of connection to the network 200 shown in FIG. 5 consists of DC power connections 291, 292; network data communications 293, 294; infrared data communications 298, 299; and audio signals 295, 296, 297. A type of connection to locally available audio sources 550 consists of audio output signals 138, 139; logic 137; audio input signals 131, 132; and infrared data communications 133, 134.

Figure 6:
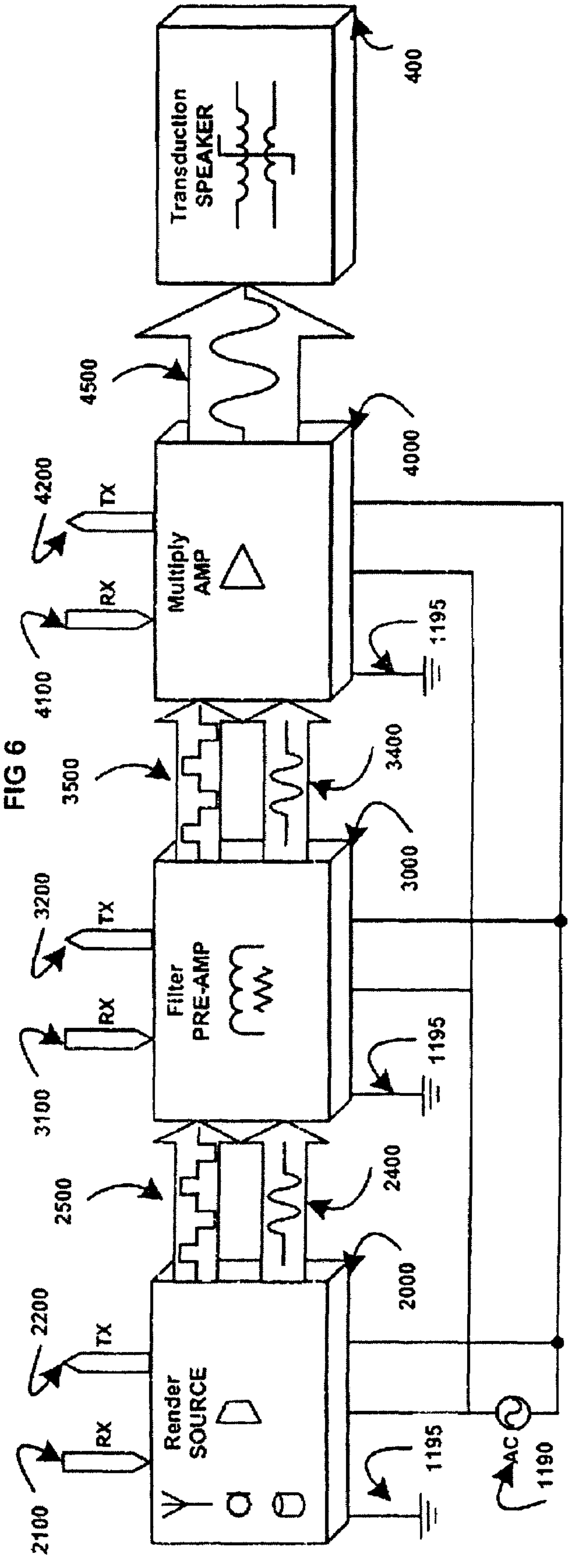
FIG. 6 is a block diagram of a typical audio system.
Figure 7:
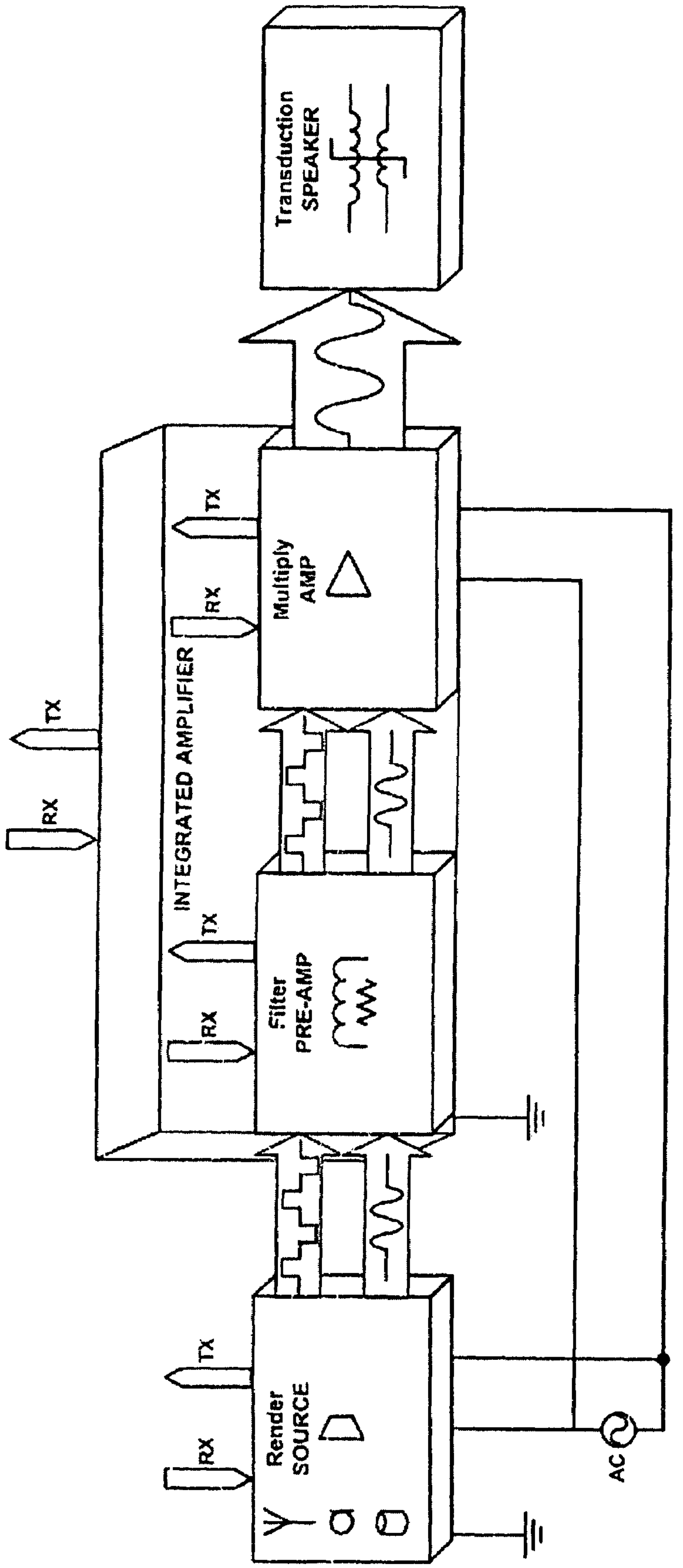
FIG. 7 is a block diagram of an audio system illustrating components contained within a typical Integrated Amplifier.
Figure 8:
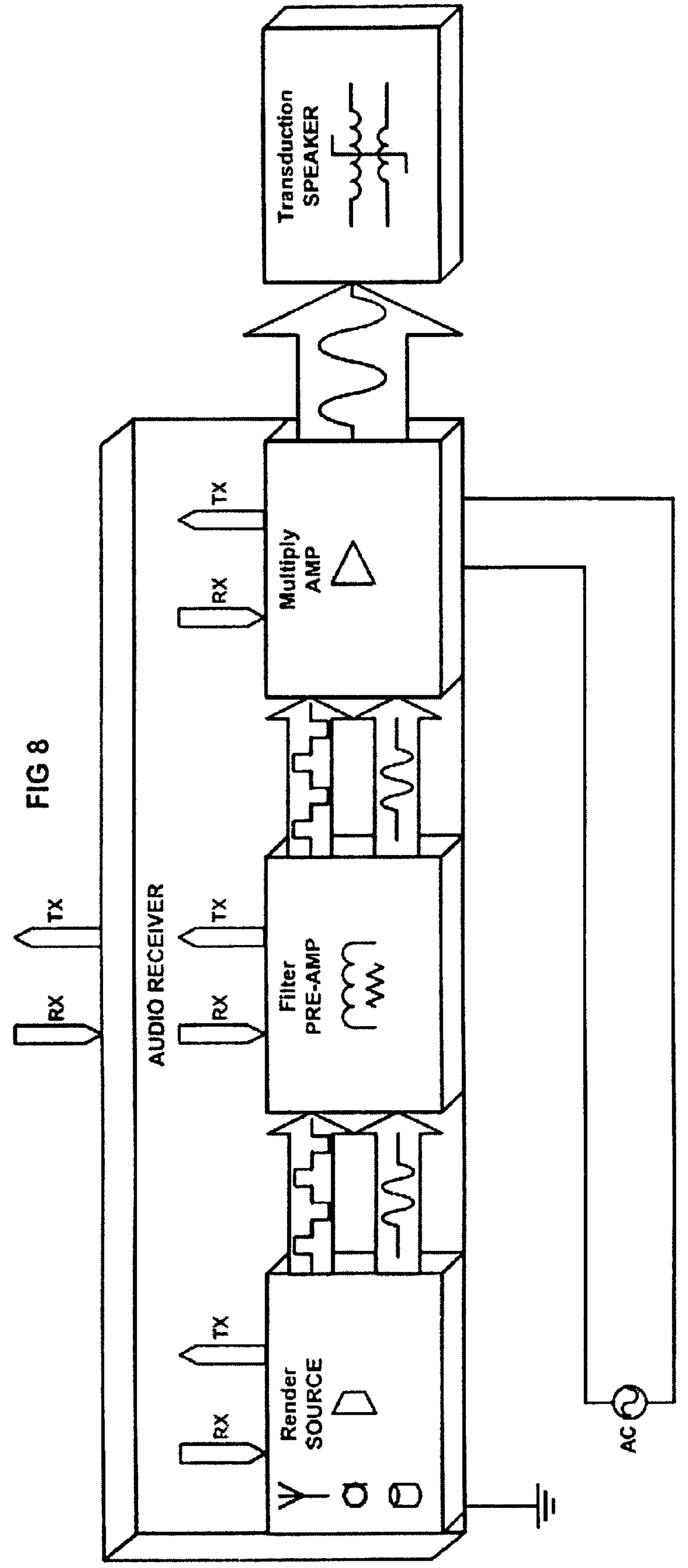
FIG. 8 is a block diagram of an audio system illustrating components contained within a typical Audio Receiver.
Figure 9:
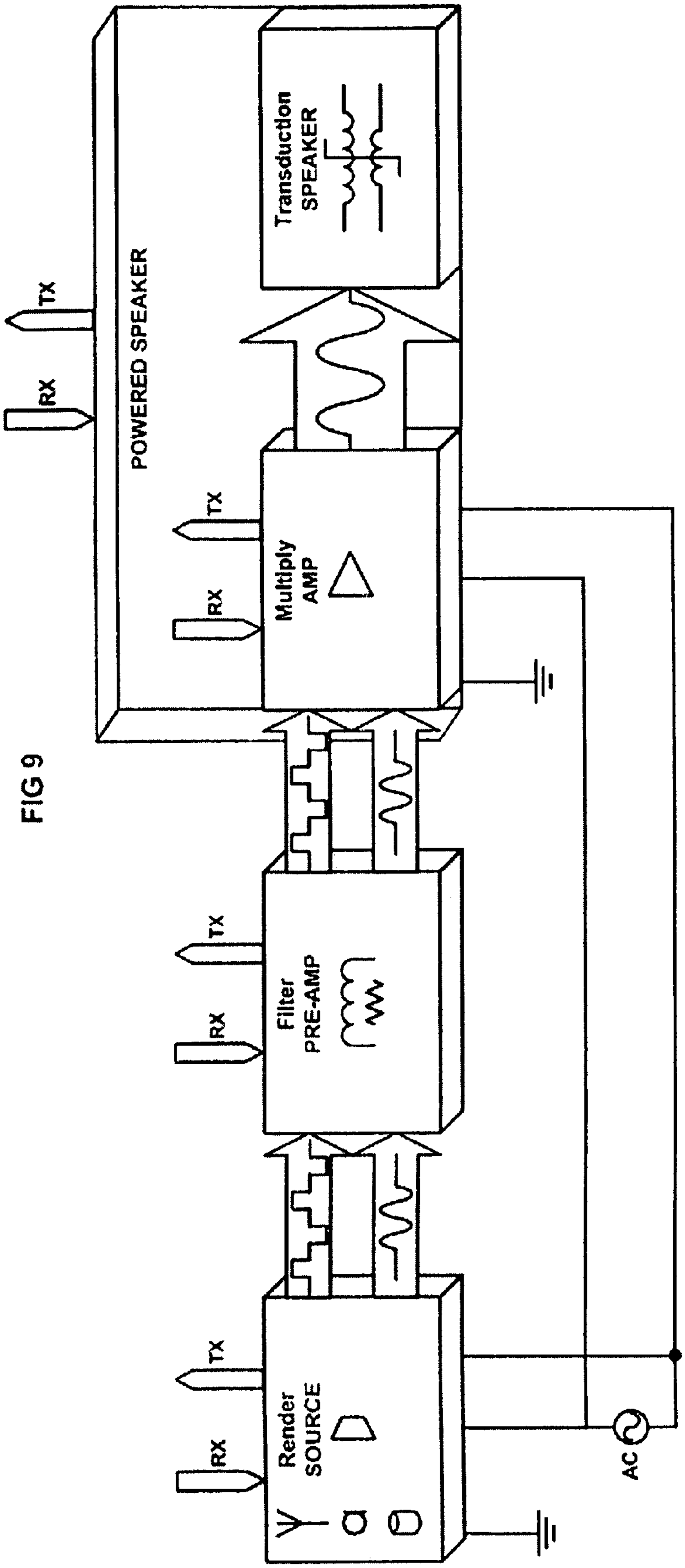
FIG. 9 is a block diagram of an audio system illustrating components contained within a typical Powered Speaker.
Figure 10:
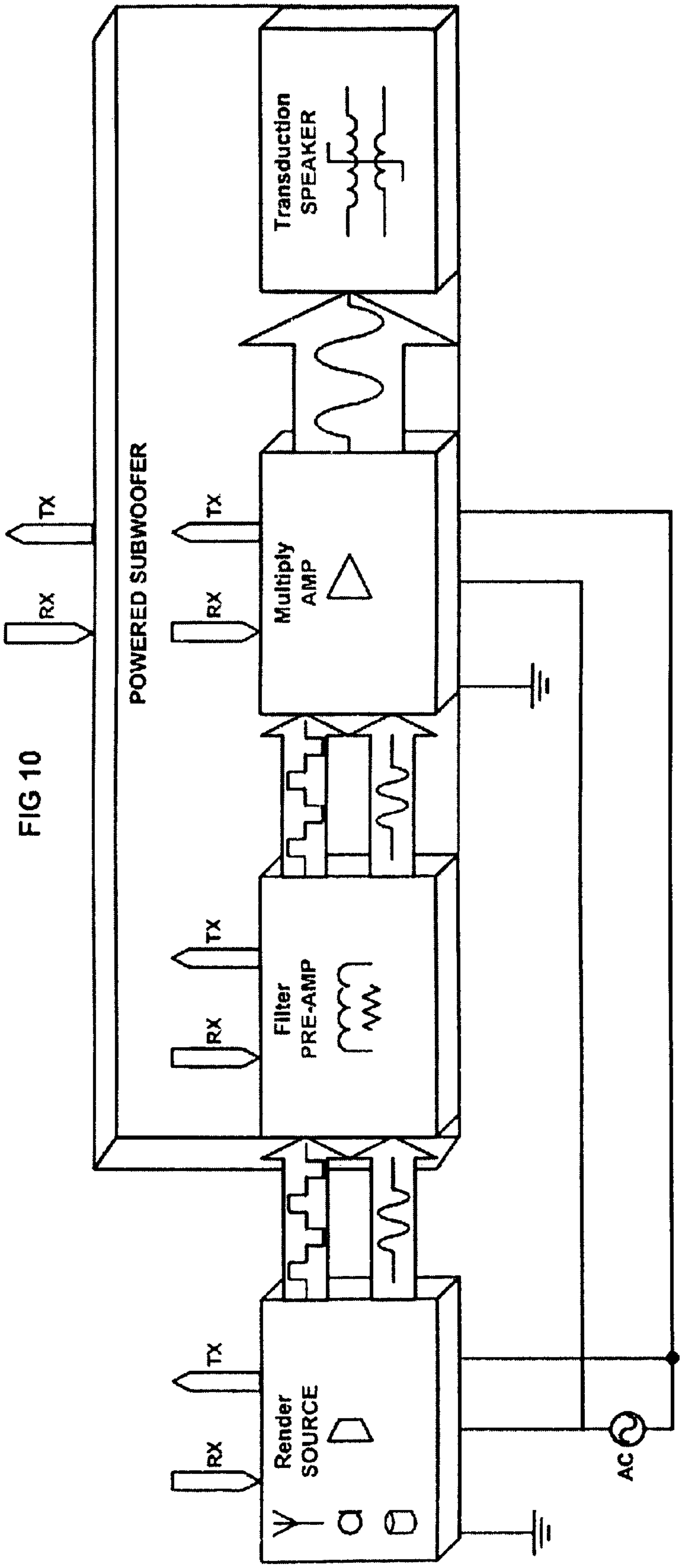
FIG. 10 is a block diagram of an audio system illustrating components contained in a typical Powered Subwoofer.

FIG. 6 illustrates a block diagram of any audio system. Shown are four main components required to create a workable audio system; namely a Source 2000, a Pre-Amp 3000, an Amplifier 4000, and a Speaker 400.

FIGS. 7-10 show block diagrams of audio systems and component clusters required for separate products.

According to another embodiment, the ICP 100 can contain provisions for the control surface to be served up via the Network 200 allowing the user to control a multi-room system away from the ICP. In other embodiments the ICP 100 can be encoded directly or remotely to provide web services to other nodes on the network such as providing the radio tuner as a streamed global source; participate within a meshed packet switched network or cluster; and store, time shift, or space shift audio content for use of rendering the audio later or remotely. In still other embodiments, the ICP 100 can render signals derived from wireless WAN technologies or from satellite services such as from XM radio, Sirius, or Worldspace.

Obviously, many modifications and variations of the present invention are possible in light of the above teachings. It is to be understood, therefore, that the invention can be practiced otherwise than as specifically described.

What is claimed is:

1. A networked integrated control node for a networked audio distribution system, where the system includes one or more networked audio distribution nodes and one or more networked integrated control nodes, and where each networked integrated control node further includes a local I/O connection to connect to a variety of local I/O devices that includes local speakers and or local audio devices, comprising:

a control processor that further comprises a flash upgradeable memory, a control surface that receives control information, IR/RF transceivers for transmitting and receiving control information, and a display device that displays control information, said control processor uses web services to control the networked audio distribution node and or other integrated control nodes in the audio distribution system;

a network connection that couples to said control processor, said network connection transmits and receives digital audio from the networked audio distribution node and or other networked integrated control nodes in the audio distribution system;

a speaker output connection that couples to said control processor, said speaker output connection transmits analog audio to the local speaker;

a local audio I/O connection that couples to said control processor, said local audio I/O connection transmits and receives digital audio or analog audio to and from the local audio device, said control processor uses said local audio I/O connection to transmit and receive control information to and from the local audio device; and a sound processing unit with an integrated amplifier that couples to said local audio I/O connection, said network connection, and said speaker output connection, said sound processing unit receives, processes, and transmits analog and digital audio between said local audio I/O connection, said network connection, and said speaker output connection.

2. The claim of claim 1 further comprising an integrated FM radio tuner with antenna connections that couples to said control processor.

3. The claim of claim 1 further comprising a power supply circuit that couples to said control processor, said power supply circuit couples to the local power or the global power supply and optionally couples to an energy storage module.

4. A method to make a networked integrated control node for a networked audio distribution system, where the system includes one or more networked audio distribution nodes and one or more networked integrated control nodes, and where each networked integrated control node further includes a local I/O connection to connect to a variety of local I/O devices that includes local speakers and or local audio devices, comprising:

providing a control processor that further comprises a flash upgradeable memory, a control surface that receives control information, IR/RF transceivers for transmitting and receiving control information, and a display device that displays control information, said control processor uses web services to control the networked audio distribution node and or other integrated control nodes in the audio distribution system;

coupling a network connection to said control processor, said network connection transmits and receives digital audio from the networked audio distribution node and or other networked integrated control nodes in the audio distribution system;

coupling a speaker output connection to said control processor, said speaker output connection transmits analog audio to the local speaker;

coupling a local audio I/O connection to said control processor, said local audio I/O connection transmits and receives digital audio or analog audio to and from the local audio device, said control processor uses said local audio I/O connection to transmit and receive control information to and from the local audio device; and coupling a sound processing unit with an integrated amplifier to said local audio I/O connection, said network connection, and said speaker output connection, said sound processing unit receives, processes, and transmits analog and digital audio between said local audio I/O connection, said network connection, and said speaker output connection.

5. The claim of claim 4 further comprising an integrated FM radio tuner with antenna connections that couples to said control processor.

6. The claim of claim 4 further comprising a power supply circuit that couples to said control processor, said power supply circuit couples to the local power or the global power supply and optionally couples to an energy storage module.

7. A method to use a networked integrated control node for a networked audio distribution system, where the system includes one or more networked audio distribution nodes and one or more networked integrated control nodes, and where each networked integrated control node further includes a local I/O connection to connect to a variety of local I/O devices that includes local speakers and or local audio devices, comprising:

using a control processor that further comprises a flash upgradeable memory, a control surface that receives control information, IR/RF transceivers for transmitting and receiving control information, and a display device that displays control information, said control processor uses web services to control the networked audio distribution node and or other integrated control nodes in the audio distribution system;

transmitting and receiving digital audio from the networked audio distribution node and or other networked integrated control nodes in the audio distribution system with a network connection, said network connection couples to said control processor;

transmitting analog audio to the local speaker through a speaker output connection, said speaker output connection couples to said control processor;

transmitting and receiving digital audio and or analog audio to and from the local audio device through a local audio I/O connection, said local audio I/O connection couples to said control processor, said control processor uses said local audio I/O connection to transmit and receive control information to and from the local audio device; and receiving, processing, and transmitting analog and or digital audio between said local audio I/O connection, said network connection, and said speaker output connection through a sound processing unit with an integrated amplifier, said sound processing unit couples to said local audio I/O connection, said network connection, and said speaker output connection.

8. The claim of claim 7 further comprising an integrated FM radio tuner with antenna connections that couples to said control processor.

9. The claim of claim 7 further comprising a power supply circuit that couples to said control processor, said power supply circuit couples to the local power or the global power supply and optionally couples to an energy storage module.

10. A program storage device readable by a computing device that tangibly embodies a program of instructions executable by the computing device to perform a method to use a networked integrated control node for a networked audio distribution system, where the system includes one or more networked audio distribution nodes and one or more networked integrated control nodes, and where each networked integrated control node further includes a local I/O connection to connect to a variety of local I/O devices that includes local speakers and or local audio devices, comprising:

using a control processor that further comprises a flash upgradeable memory, a control surface that receives control information, IR/RF transceivers for transmitting and receiving control information, and a display device that displays control information, said control processor uses web services to control the networked audio distribution node and or other integrated control nodes in the audio distribution system;

transmitting and receiving digital audio from the networked audio distribution node and or other networked integrated control nodes in the audio distribution system with a network connection, said network connection couples to said control processor;

transmitting analog audio to the local speaker through a speaker output connection, said speaker output connection couples to said control processor;

transmitting and receiving digital audio and or analog audio to and from the local audio device through a local audio I/O connection, said local audio I/O connection couples to said control processor, said control processor uses said local audio I/O connection to transmit and receive control information to and from the local audio device; and receiving, processing, and transmitting analog and or digital audio between said local audio I/O connection, said network connection, and said speaker output connection through a sound processing unit with an integrated amplifier, said sound processing unit couples to said local audio I/O connection, said network connection, and said speaker output connection.

11. The claim of claim 10 further comprising an integrated FM radio tuner with antenna connections that couples to said control processor.

12. The claim of claim 10 further comprising a power supply circuit that couples to said control processor, said power supply circuit couples to the local power or the global power supply and optionally couples to an energy storage module.

* * * * *